PZT PIEZOELECTRIC WAVE FILTER CERAMICS

Filed Jan. 3, 1962

*INVENTORS*
FRANK KULCSAR
WILLIAM R. COOK JR

*BY* [signature]

ATTORNEY

United States Patent Office 3,179,594
Patented Apr. 20, 1965

3,179,594
PZT PIEZOELECTRIC WAVE FILTER CERAMICS

Frank Kulcsar, Fairview Park, and William R. Cook, Jr., Cleveland, Ohio, assignors to Clevite Corporation, a corporation of Ohio Filed Jan. 3, 1962, Ser. No. 164,076
16 Claims. (Cl. 252—62.9)

This invention relates broadly to compositions of matter, particularly to the class of materials which have come to be known as "piezoelectric ceramics," and to articles of manufacture fabricated therefrom.

The invention specifically contemplates novel ferroelectric ceramics which are polycrystalline aggregates of certain constituency, as hereinafter described, fired to ceramic maturity and subsequently polarized or capable of being polarized, thereby acquiring electromechanical transducing properties similar to the well-known piezoelectric effect.

The invention also encompasses the unreacted physical mixtures of raw ingredients which are the precursors of such ceramic materials, the reacted product of such mixtures and the article of manufacture such as electric wave filter elements, fabricated of matured polarized ceramic. It will be understood that the term "ceramic compositions" as used hereinafter is intended to include unreacted physical mixtures and the heat reaction product thereof as well as the matured ceramic ware, whether in the form of stock, blanks, or finished elements.

In the past decade there has been considerable activity in the field of piezoelectric ceramics directed both to the development of new applications for materials heretofore available and the development of improved materials for utilization where those available were wholly unsuited or only tolerably useful. These efforts have yielded piezoelectric ceramics adequately fulfilling the needs of high power operation (i.e., capable of withstanding in service high mechanical pressures or electrical driving fields) and materials having remarkably high coupling coefficients and dielectric constant; however, the varied and oft-times critical requirements of piezoelectric ceramics for electric wave filter applications have yet to be wholly met.

As is well understood by those skilled in the wave filter art, one of the prime requisites of a material employed in the fabrication of resonator elements for electric wave filters is time and temperature stability. Any appreciable change in the characteristic value of certain properties, and in particular those affecting resonant and anti-resonant frequencies, is usually intolerable as it requires thermostating the environment to control temperature which, at best, adds cost, bulk, and complexity to the affected equipment and, at worst, may be completely unfeasible.

As for time stability of properties, there is not even the unsatisfactory remedy which is sometimes available to compensate for lack of temperature stability. It is characteristic of most of the presently available piezoelectric ceramic materials that lapse of time produces undesirably large changes in various properties affecting the characteristic resonant frequency and anti-resonant frequency. The problem of stability has been mitigated to a considerable extent in lead zirconate titanate ceramic materials by the addition of small quantities of chromium and/or uranium as described and claimed in U.S. Letters Patent No. 3,006,857 to F. Kulcsar. These compositions may be referred to hereinafter as "chromium-modified."

It is, however, sometimes desired in filter applications of piezoelectric ceramics that the material exhibit a higher value of mechanical Q ($Q_m$) than is characteristic of the aforementioned chromium-modified lead zirconate-titanate materials. In other cases it is sometimes necessary or desirable—as where a wide band filter is desired—to have a material of higher electromechanical coupling but the same or higher level of mechanical Q than is characteristic of the prior art chromium-modified lead zirconate-titanate material.

The present invention contemplates improved ferroelectric ceramic compositions which are particularly suited and adapted for use in electric wave filters or other applications requiring the same combination of properties. The compositions contemplated by the invention yield materials of two fundamental types, viz.: (1) materials distinguished by unusually high mechanical Q and having a moderately high electromechanical coupling and (2) materials combining very high coupling with moderately high $Q_m$. The materials of both types possess sufficient and, in some cases, remarkable temperature stability of frequency adapting them for a wide variety of filter applications.

Polycrystalline ferroelectric ceramic compositions in accordance with the present invention consist essentially of lead, zirconium, titanium, and oxygen, in substantially stoichiometric proportions corresponding to lead zirconate and lead titanate effectively in solid solution in mol ratios 60:40 to 35:65 and containing small additions of chromium and having magnesium substituted for up to 10 atom percent of the lead. The compositions optionally may contain small quantities of iron and/or part of the lead may be substituted by one or more of the alkaline earths, barium, strontium and calcium up to a total, including magnesium, of 20 atom percent.

It is the fundamental object of the present invention to provide novel piezoelectric ceramic materials which overcome or mitigate at least one of the problems of the prior art as outlined above.

A more specific object of the invention is to provide piezoelectric ceramic materials particularly adapted for use in electric wave filter applications.

A further object of the invention is the provision of new and useful ferroelectric ceramic materials characterized by high mechanical Q and low temperature dependence of resonant and anti-resonant frequency.

Another object is the provision of time and temperature stable piezoelectric ceramic materials combining high mechanical Q with moderately high electromechanical coupling coefficient.

Still another object of the invention is the provision of piezoelectric ceramic materials which combine very high electromechanical coupling with moderately high mechanical Q.

These and further objects of the invention, its advantages, scope and the manner in which it may be practiced will be readily apparent to those conversant with the art from a reading of the following description and subjoined claims in conjunction with the annexed drawing in which like parts are designated by like reference characters throughout the several views and in which:

Figure 1:
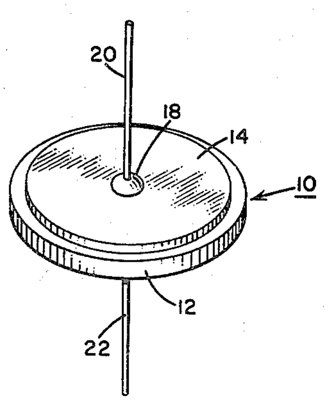
FIGURE 1 is a perspective elevational view of a simple filter resonator embodying material according to the present invention.
Figure 2:
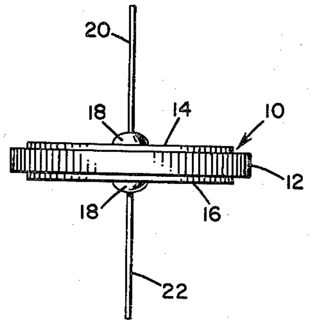
FIGURE 2 is a side elevational view of the resonator shown in FIGURE 1.

Before proceeding with a detailed description of the ceramic compositions contemplated by the invention, their application to filter resonator elements will be described with reference to FIGURES 1 and 2 of the drawings wherein reference character 10 designates, as a whole, an electromechanical transducer having, as its active element, a preferably disk-shaped body 12 of a piezoelectric ceramic material according to the present invention.

Transducer 10 is shown and will be described herein as a simple electroded disk resonator merely for purposes of example and in the interest of simplicity. While such disks are widely used in various ways in the construction of filter networks, it is to be understood that the materials herein described can be employed with advantage to the fabrication of a wide variety of specifically different filter resonators and elements. Thus, for example, the materials can be utilized in the fabrication of such filter devices as disclosed in U.S. Letters Patents Nos. 2,877,432 to O. Mattiat and 2,969,512 to H. Jaffe and D. A. Berlincourt, as well as those described and claimed in copending application Serial No. 849,070, filed October 27, 1959, by D. R. Curran and A. Berohn and assigned to the same assignee as the present invention.

Reverting to the exemplary device illustrated in FIGURES 1 and 2, body 12 is electrostatically polarized, in a manner hereinafter set forth, and provided with a pair of electrodes 14 and 16, applied in any suitable way, on two opposed surfaces thereof. Conductively attached to electrodes 14 and 16, as by solder 18 are respective lead wires 20 and 22 operative to enable the connection of the resonator in the electrical or electronic circuit, not shown, in which it is to be employed. As is well-known in the art, an electromechanical transducer operates to convert applied electrical energy to mechanical energy and vice versa. Therefore, if the ceramic body is subjected to mechanical stresses, the resulting strain generates an electrical output appearing as a voltage across the leads 20, 22. Conversely, a voltage applied across the leads produces a strain or mechanical deformation of ceramic bodies 12. It is to be understood that the term electromechanical transducer as used herein is taken in its broadest sense and to include, particularly, piezoelectric filter resonator elements, frequency control devices, and the like, and that the invention may also be used and adapted to various other applications requiring materials having dielectric, piezoelectric and/or electrostrictive properties such as herein described.

In most commercial applications ceramic body 12 would be polarized in the thickness direction, i.e., in a direction parallel to the rotary axis of the disk and perpendicular to its major faces. This is conveniently accomplished by application of a relatively high electrostatic field to the material as by connecting a suitable voltage source between leads 20 and 22. While the precise value of the poling field is subject to variation with the specific composition of the material and other factors, it is in the order of several thousand volts per millimeter of thickness. For additional information regarding techniques for the polarization of piezoelectric ceramic materials of the general type contemplated by the present invention, reference may be had to U.S. Letters Patent No. 2,928,163 to D.A. Berlincourt and F. Brunarski.

After polarization, a signal applied between the major faces of the disk causes the disk to vibrate at frequencies and with amplitudes corresponding to the signal voltage. The vibrations are most intense in two distinct frequency ranges, the lower of which relates to resonance of the radial mode and the higher to resonance of the thickness mode. Either of these two major resonances may be employed in wave filters. The disk (or whatever other resonator shape is employed) is proportioned to achieve sufficient separation between the respective resonances of thickness and radial mode vibration to avoid interference therebetween. For example, in the case of a disk for radial mode operation, the thickness dimension is made very small relative to the diameter, the latter being selected to obtain the desired frequency of resonance in the radial mode.

Inasmuch as the compositions contemplated by the present invention essentially comprise lead zirconate-titanate as a principal constitutent, they will be described as derived from lead zirconate-titanate by additive and/or substitutional modifications thereof.

As is now well-known in the art, lead zirconate-titanate piezoelectric ceramics are polycrystalline solid solutions characterized by a pseudo-cubic, perovskite type crystal structure. The solid solution system exhibits a substantially morphotropic phase boundary at temperatures below the Curie point and occurring at approximately the 53:47 mol ratio of lead zirconate to lead titanate. This morphotropic phase boundary delineates between a phase of rhombohedral symmetry which lies on the high lead zirconate side and a phase of tetragonal symmetry on the high lead titanate side. By virtue of and in proportion to compositional proximity to the morphotropic phase boundary, lead zirconate-titanate materials as a class exhibit highly desirable electrical and mechanical properties, particularly, when electrostatically polarized as hereinbefore described, a high electromechanical coupling coefficient. The range of mol ratios over which lead zirconate-titanate compositions exhibit significant piezoelectric activity and examples of preferred materials, together with their physical and electrical properties are disclosed with particularity in U.S. Letters Patent No. 2,708,244, issued on May 10, 1955 to B. Jaffe.

The present invention is based on the discovery that within particular ranges of mol ratios and with certain modifying agents as hereinafter described with particularity, lead zirconate-titanate-based materials can be formulated which exhibit unique combinations of properties particularly adapting them for use as electromechanical resonators for electric wave filter devices and networks.

This description has already alluded to the fact that two types of materials are embraced by the invention; these two types can, and presently will, be delineated by reference to the proximity of the morphotropic phase boundary. First, however, it should be understood that all compositions contemplated by the invention fall within a general range of mol ratios which bridges the phase boundary; consequently, the materials may be of either rhombohedral or tetragonal crystal structure. Within the general range of mol ratios, one group of compositions lies entirely on the tetragonal side of, and at a distance from the phase boundary; these will be referred to hereinafter as "remote tetragonal." The other group of compositions has mol ratios locating its members on, or in the vicinity and on either side of, the phase boundary; these accordingly are referred to hereinafter as "phase boundary compositions."

"Remote tetragonal" materials are characterized by a very high mechanical quality factor ($Q_m$) and temperature stability of resonant and anti-resonant frequency and moderate electromechanical coupling; these materials are of particular value in filters where selectivity and temperature stability are more important than large bandwidth as, generally speaking, the electromechanical coupling coefficient is markedly lower than for phase boundary materials. These latter materials, by virtue of high electromechanical coupling, excel in the provision of large bandwidths; their time and temperature stability is good.

Before undertaking the description of specific and preferred exemplary compositions and the manner of their formulation, it is pointed out that, as will be appreciated by those conversant with the art, hafnium occurs as an impurity in varying amounts in zirconium; for the purposes of the invention, hafnium may be regarded as the substantial equivalent of zirconium and the presence of hafnium either as an impurity or as a substituent for zirconium is acceptable. However, because the high cost of hafnium as compared to zirconium renders its use uneconomic in commercial manufacture of the compositions under discussion, the present description disregards the possible presence of hafnium.

It is also pointed out that, while certain modifying ingredients are referred to as substituting for lead, this is intended to convey only the fact that in formulating the compositions, appropriate quantities of lead are omitted corresponding on an atom-for-atom basis to the added substituent ingredient; it is not intended to convey either the fact, or the necessity, that the substituting elements enter the crystal lattice at the lead position, although this is believed to be the case, at least in part. Furthermore, the compositions are described as formulated from various elemental ingredients in oxide form; while the materials are actually formulated by the heat reaction of component oxides it will be understood that other suitable compound forms can be used if desired. Thus, for example, elemental ingredients may be in the form of carbonates which decompose during the heat reaction to form an oxide with the evolution of carbon monoxide and/or dioxide.

As indicated by the perovskite-type formula, $ABO_3$, the lead, zirconium, and titanium atoms are considered to be linked to oxygen atoms in the crystal lattice and the same is true of additives and substituted ingredients.

The general range of $PbZrO_3$:$PbTiO_3$ mol ratios of compositions according to the present invention is from 60:40 to 35:65; all contain chromium in an aggregate quantity equivalent on a mol basis to an addition of .1 to 1.5 weight percent of chromic oxide ($Cr_2O_3$) as described in the aforementioned U.S. Letters Patent No. 3,006,857, which teaches the addition of chromium (and/or uranium) to lead zirconate-titanate of (Zr:Ti) mol ratios 60:40 to 45:55. At this juncture it is pointed out that the range of mol ratios yielding "remote tetragonal" materials includes materials containing 55 mol percent titanate or less; however, certain forms of such materials are disclosed and claimed in U.S. Letters Patent No. 3,006,857 and, therefore, for the purposes of this description and the subjoined claims "remote tetragonal" compositions may be regarded as having more than 55 mol percent titanate and up to 65%.

In the preferred compositions contemplated by the invention, 1 to 10 atom percent of the lead is replaced with magnesium. The preferred extent of substitution is about 5 atom percent. This substitution raises the mechanical Q of the resulting material, the effect being more pronounced in the remote tetragonal compositions. Thus, for example, a typical chromium-modified phase boundary composition may have a mechanical Q in the order of 300; with a substitution of 5 atom percent magnesium for lead, the value of Q is raised 25 to 50%; and with a remote tetragonal mol ratio, an increase of 200 or 300 percent can be achieved.

A general improvement of properties usually is obtained by further substitution of one or more of the alkaline earth elements barium, strontium and calcium for 1 to 10 atom percent of the lead, the total replacement of lead including that substituted by magnesium, being no more than about 20 atom percent. The effect of barium, strontium and calcium on properties of the material is sometimes diffuse; however, these additives facilitate production of the ceramic and enhance reproducibilty of results. Moreover, barium, strontium, and calcium appear to have the ability in their own rights to increase mechanical Q albeit not to a degree approaching that of magnesium.

In the case of remote tetragonal compositions, the concurrence of Zr/Ti mol ratios around 40:60 to 35:65, the magnesium substitution, and the addition of chromium quite evidently have a synergistic effect, yielding materials of much higher mechanical Q than could reasonably be attributed to the sum of the effects of the individual contributing factors. This is evident from a consideration of the following tabulation of exemplary compositions:

*Table I*

| | Intended Composition | $Q_m$ |
|---|---|---|
| (a) [1] | $Pb(Zr_{.53}Ti_{.47})O_3$+.80 W% $Cr_2O_3$ | 463 |
| (b) | $Pb(Zr_{.40}Ti_{.60})O_3$+.75 W% $Cr_2O_3$ | 660 |
| (c) | $Pb_{.95}Mg_{.05}(Zr_{.53}Ti_{.47})O_3$+ .75 W% $Cr_2O_3$ | 560 |
| (d) | $Pb_{.05}Mg_{.05}(Zr_{.40}Ti_{.60})O_3$+.75 W% $Cr_2O_3$ | 1,410 |

[1] Example No. 6, U.S. Patent No. 3,006,857.

Comparing Examples (*a*) and (*b*) it will be appreciated that shifting the mol ratio of a chromium-modified phase boundary composition toward the tetragonal produces about a 30 percent increase in the value of $Q_m$; a comparison of (*a*) and (*c*) demonstrates that an improvement in $Q_m$ of generally similar magnitude can be achieved by substitution of 5 atom percent Mg for Pb. However, the combined effect of the Mg substitution and the remote tetragonal mol ratio is an increase of more than 300 percent in the value of $Q_m$.

Compositions according to the present invention may also contain small quantities of iron equivalent to an addition of from 0.1 to 1.0 weight percent of ferric oxide ($Fe_2O_3$). The preferred quantity is about 0.5 weight percent. The iron causes an additional increase in, and diminishes the temperature dependence of, mechanical Q.

Aside from the synergistic improvement in $Q_m$ resulting from the conjoint action of magnesium, chromium and particular $ZrO_3$:$TiO_3$ mol ratios, it has been discovered that the mol ratios have a critical individual effect on the temperature stability of properties affecting resonant and anti-resonant frequency. Specifically, within certain very narrow segments of the remote tetragonal range of mol ratios and even narrower segments of the range of mol ratios adjacent the phase boundary, variation of resonant and anti-resonant frequency with temperature is practically nil. The absolute values of $ZrO_3$:$TiO_3$ mol ratios producing zero temperature dependenec of frequency varies with the identity and quantity of the modifying ingredients as well as the mode of vibration involved; consequently, for any given composition the exact mol ratio for minimum temperature dependence must be determined empirically. For preferred remote tetragonal composition according to the present invention, the $ZrO_3$:$TiO_3$ mol ratio of minimum temperature dependence is around 43:57 to 44.5:55.5; the value is critical to within 1 or 2 units of the ratio. For phase boundary compositions the value of mol ratio is even more critical, i.e., to within 1 unit or less; the optimum value for preferred compositions is around 52:48 to 53.47.

While compositions containing magnesium are generally superior and, therefore, preferred, it is pointed out that remote tetragonal chromium-modified compositions devoid of magnesium also are contemplated by the invention. The minimum temperature dependence effect which can be achieved by proper selection of the mol ratio is in no way dependent on the presence of magnesium although, as previously mentioned, the constituency may affect the particular optimum value of the ratio. Furthermore, chromium-modified remote tetragonal lead zirconate titanate compositions with barium, calcium and/or strontium substituted for up to 10 atom percent of the lead can be formulated to have values of mechanical Q similar to magnesium-substituted phase boundary compositions. For example, a composition with a $ZrO_3/TiO_3$ mol ratio of 44.5:55.5, 5 atom percent barium substitution and an addition of 0.75 weight percent chromic oxide had values of $Q_m$ exceeding 700 and planar coupling coefficients exceeding .250.

The materials being described may be prepared in accordance with various ceramic procedures which, in themselves, are well-known in the art. Except for the constituents magnesium and iron the techniques for compounding basic lead zirconate-lead titanate compositions as well as those with alkaline earths substituted for lead and those containing additions of chromium are fully described in the aforementioned U.S. Letters Patent and copending application Serial No. 151,847, filed November 13, 1961, and assigned to the same assignee as the present invention. As pointed out in Patent No. 3,006,857 the chromium (and/or uranium) additions may, if desired, be balanced with lead. For example, if chromic sesqui-oxide ($Cr_2O_3$) is added, this may be balanced by adding a quantity of lead oxide (PbO) sufficient to give the stoichiometric proportions for lead chromate ($PbCrO_4$). Alternatively, the addition may be in the form of lead chromate rather than its component oxides. The additions may be unbalanced or only partially balanced.

The magnesium substitution may be in the form of an oxide of magnesium, magnesium carbonate, or other suitable compounds, magnesium oxide ($MgO$) having been utilized in the formulation of the specific examples mentioned above and described hereinbelow. The data for compositions given hereinbelow were obtained from thin test disks prepared substantially in the following manner.

Lead oxide ($PbO$), zirconia ($ZrO_2$) and titania ($TiO_2$), all of relatively pure grade, were combined in proper proportions corresponding to lead zirconate-lead titanate in the mol ratios desired and including oxides and/or coupling coefficient; however, because of the relatively high value of the coupling coefficient initially, the reduction is no particular detriment and is more than off-set by the improvement in aging and temperature stability of the material. The following is a tabulation of specific exemplary compositions according to the invention, including preferred embodiments thereof, and various pertinent electrical and electromechanical properties of importance to piezoelectric materials generally and filter applications thereof in particular. In the tabulation the composition is identified by its intended formula; all measurements were made at room temperature subsequent to polarization and heat treatment, if any. Table II includes the compositions listed in Table I, supra.

*Table II*

| Ex. No. | [A] Pb and metal ion substituents (atom percent) | | | [BO₃] $ZrO_3:TiO_3$ mol ratio | Additions in weight percent | | Mechanical Q ($Q_m$) | Planar electromechanical coupling coefficient ($k_p$) | Dielectric constant (K) | Electrical dissipation (D), percent |
|---|---|---|---|---|---|---|---|---|---|---|
| | Pb | Mg | Ba/Sr | | $Cr_2O_3$ | $Fe_2O_3$ | | | | |
| 0 | 1.0 | | | 54:46 | 0.75 | | 419 | .367 | 790 | 1.77 |
| 1 | 1.0 | | | 40:60 | 0.75 | | 660 | .120 | 319 | 3.97 |
| 2 | .95 | .05 | | 40:60 | 0.75 | | 1,410 | .215 | 385 | 1.02 |
| 3 | .95 | .05 | | 42:58 | 0.75 | | 1,446 | .237 | 375 | 1.05 |
| 4 | .95 | .05 | | 44:56 | 0.75 | | 1,336 | .255 | 425 | 1.04 |
| 5 | .93 | .07 | | 44:56 | 0.75 | | 1,142 | .316 | 489 | 0.89 |
| 6 | .90 | .10 | | 44:56 | 0.75 | | 1,057 | .283 | 437 | 0.83 |
| 7 | .95 | .05 | | 44.5:55.5 | 0.75 | 0.40 | 1,456 | .276 | 493 | 0.47 |
| 8 | .95 | .05 | | 44.5:55.5 | 0.75 | 0.50 | 1,448 | .301 | 511 | 0.40 |
| 9 | .95 | .05 | | 44.5:55.5 | 0.75 | 0.75 | 1,468 | .295 | 499 | 0.34 |
| 10 | .95 | .05 | | 45:55 | 0.75 | 0.50 | 1,445 | .289 | 508 | 0.45 |
| 11 | .98 | .02 | | 45.5:54.5 | 0.75 | | 1,082 | .275 | 496 | 1.24 |
| 12 | .97 | .03 | | 45.5:54.5 | 0.75 | | 999 | .293 | 493 | 1.03 |
| 13 | .95 | .05 | | 45.5:54.5 | 0.75 | | 1,097 | .307 | 498 | 0.86 |
| 14 | .95 | .05 | | 46.5:53.5 | 0.75 | | 1,446 | .237 | 375 | 1.05 |
| 15 | .95 | .05 | | 51:49 | 0.70 | | 536 | .509 | 939 | 1.25 |
| 16 | .95 | .05 | | 52:48 | 0.70 | | 545 | .527 | 645 | 1.07 |
| 17 | .95 | .05 | | 52.5:47.5 | 0.70 | 0.50 | 678 | .515 | 926 | 0.59 |
| 18 | .95 | .05 | | 53:47 | 0.70 | 0.50 | 615 | .511 | 947 | 0.98 |
| 19 | .95 | .04 | .01(Sr) | 52:48 | 0.70 | 0.50 | 627 | .512 | 1,113 | 0.67 |
| 20 | .95 | .03 | .02(Sr) | 52:48 | 0.70 | 0.50 | 608 | .523 | 1,089 | 0.76 |
| 21 | .95 | | .05(Ba) | 44.5:55.5 | 0.75 | | 705 | .256 | 514 | 2.15 |
| 22 | .95 | | .05(Ba) | 45.5:54.5 | 0.75 | | 935 | .260 | 544 | 1.50 |
| 23 | .95 | | .05(Sr) | 45.5:54.5 | 0.75 | | 689 | .284 | 502 | 1.92 |
| 24 | .90 | | .10(Sr) | 45.5:54.5 | 0.75 | | 611 | .277 | 687 | 2.09 |

carbonates of additions and lead substituents. Chromium additions were in the form of chromic oxide ($Cr_2O_3$) and iron as ferric oxide ($Fe_2O_3$). The mixture was ground to achieve thorough mixing and particle size reduction. As small and uniform an average particle size as possible is preferred. In grinding the ingredients, care was exercised to avoid contamination.

The resulting powder was then pre-reacted by sintering at a temperature of around 850° C. for approximately two hours. During sintering and ultimately during firing to maturity it is desirable to control loss of lead by suitable means well-known in the art.

After allowing the pre-reacted material to cool it was crushed and ground again to an average particle size of about 1½ microns. A pressing mix is then made of the resulting powder by adding a suitable binding and lubricating agent such as solutions of sorbitol, polyvinyl alcohol, or "Mobilcer-C." For example, the powder was mixed at the rate of 16 grams per cc. of a solution consisting by volume of 2 parts water and 3 parts of a 70% solution of sorbitol ($C_6H_{14}O_6 \cdot \frac{1}{2}H_2O$). The resulting mix was then pressed into disks roughly one inch in diameter and 3/32 inch thick which were fired to maturity at a temperature of around 1285° C. for about 45 minutes.

The fired disks were then electroded and polarized in a manner well-known in the art. After poling, the disks preferably are, and, in the case of some of the examples on which data are given, were subjected to a heat treatment which consisted of heating the disks to a temperature of about 150° to 250° C. for a period of 12 to 48 hours. It will be appreciated, of course, that a somewhat higher temperature may be used but in any case it should not approach, much less exceed, the Curie temperature of the particular material involved. The heat treatment in most cases causes a small decrease in electromechanical From Table II it will be readily evident that all exemplary compositions are characterized by good planar coupling, relatively high dielectric constant and mechanical Q, and low dissipation, all of which properties are important to the use of piezoelectric materials in filter applications.

The first 18 compositions are arranged in the order of ascending zirconium content, i.e., the mol ratios (except for Example 0) progress from remote tetragonal to phase boundary values. In this progression, the trend of $Q_m$ values is downward and of $k_p$ upward. The optimum remote tetragonal compositions combine $Q_m$ values in the order of 1300 and 1400 with planar coupling coefficients in the vicinity of 0.30 whereas the optimum phase boundary compositions have planar couplings near 50% and $Q_m$ values around 600. The effects of varying other compositional parameters also are demonstrated by and are self-evident from the tabulation of exemplary compositions.

Figure 3:
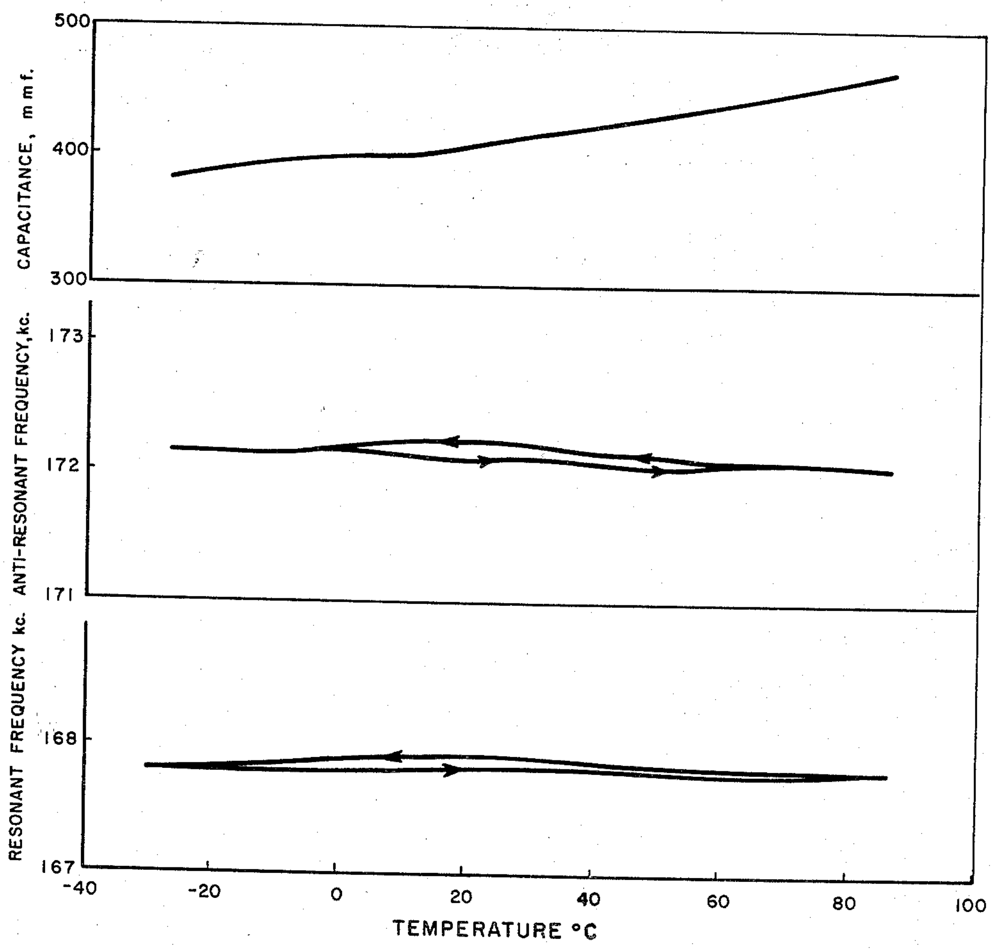
FIGURE 3 is a graphic representation of the effect of temperature variation on frequency and capacitance of an exemplary composition according to the present invention.

As previously explained, the temperature dependence of frequency of compositions according to the invention can be minimized by proper selection of the $ZrO_3:TiO_3$ mol ratio; this is shown graphically for the Example No. 7 composition in FIGURE 3 from which it will be seen that temperature cycling between −30 and +90° C. causes practically no change (about 0.13% maximum) in either resonant or anti-resonant frequency. The value of capacitance shows a small direct variation with temperature over the same range; this is not so large as to be detrimental in most filter applications but, inasmuch as the variation is nearly linear, it is easily compensated, if necessary.

The aging characteristics of the materials are also highly suited to filter applications as will be seen from the following tabulation of the variation of resonant frequency $f_r$ and anti-resonant frequency $f_a$ with time:

*Table III*

| Example composition number | Aging time (weeks) | Percent change | |
|---|---|---|---|
| | | $f_a$ | $f_r$ |
| 2 | 3 | +.049 | +.087 |
| 13 | 16 | +.07 | +.16 |

The physical quality of the ceramic is good and the materials are susceptible of relatively easy polarization.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is desired to be secured by United States Letters Patent is:

1. A polycrystalline ceramic composition consisting essentially of lead, zirconium, titanium and oxygen, in substantially stoichiometric proportions corresponding to lead zirconate and lead titanate effectively in solid solution in a mol ratio of 60:40 to 35:65, a finite quantity of the lead, from about 1% up to 10 atom percent, being substituted by magnesium.

2. A polycrystalline ceramic composition according to claim 1 containing a quantity of chromium equivalent to from 0.1 to 1.5 weight percent of chromic oxide ($Cr_2O_3$).

3. A polycrystalline ceramic composition according to claim 2 containing a quantity of iron equivalent to from 0.1 to 1.00 weight percent of ferric oxide ($Fe_2O_3$).

4. A polycrystalline ceramic composition according to claim 1 wherein a finite quantity of the lead is substituted by at least one alkaline earth selected from the group consisting of barium, strontium and calcium, the aggregate quantity of lead substituted by magnesium and said alkaline earths being no greater than 20 atom percent.

5. A polycrystalline ceramic composition according to claim 4 containing a quantity of chromium equivalent to 0.1 to 1.5 weight percent chromic oxide ($Cr_2O_3$).

6. A polycrystalline ceramic composition according to claim 5 containing a quantity of iron equivalent to from 0.1 to 1.0 weight percent of ferric oxide ($Fe_2O_3$).

7. A polycrystalline ceramic composition consisting essentially of lead, zirconium, titanium and oxygen, in substantially stoichiometric proportions corresponding to lead zirconate and lead titanate effectively in solid solution, the mol fraction of lead titanate being in excess of 55% but not substantially greater than 65%, said composition containing a quantity of chromium equivalent to from 0.1 to 1.5 weight percent of chromic oxide ($Cr_2O_3$).

8. A polycrystalline ceramic composition according to claim 7 wherein a finite quantity of the lead is substituted by at least one alkaline earth selected from the group consisting of barium, strontium and calcium, the aggregate quantity of lead substituted by said alkaline earth being no greater than 10 atom percent.

9. A polycrystalline ceramic composition according to claim 8 containing a quantity of iron equivalent to from 0.1 to 1.0 weight percent of ferric oxide ($Fe_2O_3$).

10. A polycrystalline ceramic composition consisting essentially of lead, zirconium, titanium and oxygen, in substantially stoichiometric proportions corresponding to lead zirconate and lead titanate effectively in solid solution in a mol ratio of 43:57 to 44.5:55.5 and containing a quantity of chromium equivalent to .1 to 1.5 weight percent of chromic oxide ($Cr_2O_3$).

11. A polycrystalline ceramic composition according to claim 10 wherein a finite quantity of the lead ranging up to 10 atom percent is substituted by magnesium.

12. A polycrystalline ceramic composition according to claim 11 containing a quantity of iron equivalent from 0.1 to 1.00 weight percent of ferric oxide ($Fe_2O_3$).

13. A polycrystalline ceramic composition consisting essentially of lead, zirconium, titanium and oxygen, effectively in solid solution, in substantially stoichiometric proportions corresponding to lead zirconate and lead titanate in a mol ratio of 43:57 to 44.5:55.5 a finite quantity of the lead, from about 1% up to 10 atom percent, being substituted by an alkaline earth selected from the group consisting of Sr, Ca and Ba, said composition containing a quantity of chromium equivalent to .1 to 1.5 weight percent of chromic oxide ($Cr_2O_3$).

14. A polycrystalline ceramic composition according to claim 13 containing a quantity of iron equivalent from 0.1 to 1.0 weight percent of ferric oxide ($Fe_2O_3$).

15. A polycrystalline ceramic composition consisting essentially of $Pb_{.95}Mg_{.05}(Zr_{.445}Ti_{.555})O_3$ and containing oxidic chromium in a quantity equivalent to 0.75 weight percent chromic oxide ($Cr_2O_3$) and oxidic iron in a quantity equivalent to 0.5 weight percent ferric oxide ($Fe_2O_3$).

16. A polycrystalline ceramic composition consisting essentially of $Pb_{.95}Mg_{.05}(Zr_{.53}Ti_{.47})O_3$ and containing oxidic chromium in a quantity equivalent to 0.7 weight percent chromic oxide ($Cr_2O_3$) and oxidic iron in a quantity equivalent to 0.5 weight percent ferric oxide ($Fe_2O_3$).

References Cited by the Examiner

UNITED STATES PATENTS

| | | | |
|---|---|---|---|
| 2,852,400 | 9/58 | Remeika | 252—62.9 |
| 3,006,857 | 10/61 | Kulcsar | 252—62.9 |
| 3,013,977 | 12/61 | Berman et al. | 252—62.9 |
| 3,068,177 | 12/62 | Sugden | 252—62.9 |

MAURICE A. BRINDISI, *Primary Examiner.*

JULIUS GREENWALD, *Examiner.*